United States Patent
Butler et al.

(10) Patent No.: US 11,238,752 B2
(45) Date of Patent: *Feb. 1, 2022

(54) PHONICS EXPLORATION TOY

(71) Applicant: Learning Squared, Inc., Sunnyvale, CA (US)

(72) Inventors: Andrew Butler, Sunnyvale, CA (US); Tom Boeckle, Las Vegas, NV (US); Hector Javier Farias, Castro Valley, CA (US); F Brian Iannce, San Jose, CA (US); Carey Lee, Redwood City, CA (US)

(73) Assignee: Learning Squared, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/794,570

(22) Filed: Feb. 19, 2020

(65) Prior Publication Data

US 2020/0242961 A1 Jul. 30, 2020

Related U.S. Application Data

(63) Continuation of application No. 14/730,232, filed on Jun. 3, 2015, now Pat. No. 10,607,502.

(Continued)

(51) Int. Cl.
*G09B 17/00* (2006.01)
*G09B 1/06* (2006.01)
(Continued)

(52) U.S. Cl.
CPC .............. *G09B 17/006* (2013.01); *G09B 1/06* (2013.01); *G09B 17/003* (2013.01); *G09B 19/04* (2013.01);
(Continued)

(58) Field of Classification Search
CPC ...... G09B 17/006; G09B 17/003; G09B 19/04; G09B 1/06; A63F 3/00643;
(Continued)

(56) References Cited

U.S. PATENT DOCUMENTS 3,724,110 A 4/1973 Meyerson
4,101,884 A 7/1978 Benton, Jr.
(Continued)

FOREIGN PATENT DOCUMENTS

| CN | 112384961 | 2/2021 |
| IN | 202117000616 A | 3/2021 |
| WO | WO-2019246174 A1 | 12/2019 |

OTHER PUBLICATIONS

"U.S. Appl. No. 16/016,585, Final Office Action dated Dec. 24, 2020", 32 pgs.
(Continued)

*Primary Examiner* — Jack Yip
(74) *Attorney, Agent, or Firm* — Schwegman Lundberg & Woessner, P.A.

(57) ABSTRACT

A phonics learning system, comprising a letter identification board and letter manipulatives that may be placed on the letter identification board by a child, and a computing device connected to the letter identification board that identifies the letters placed on the board, generates a phonetic pronunciation for the combination of letters, and identifies any words or misspelled words.

20 Claims, 7 Drawing Sheets

Related U.S. Application Data

(60) Provisional application No. 62/007,413, filed on Jun. 4, 2014.

(51) Int. Cl.
    *G09B 19/04*       (2006.01)
    *G06F 3/044*       (2006.01)
    *A63F 3/00*        (2006.01)
    *H04B 5/00*        (2006.01)

(52) U.S. Cl.
    CPC . *A63F 3/00643* (2013.01); *A63F 2003/00662* (2013.01); *G06F 3/044* (2013.01); *H04B 5/00* (2013.01); *H04B 5/0012* (2013.01)

(58) Field of Classification Search
    CPC . A63F 2003/00662; G06F 3/044; H04B 5/00; H04B 5/001
    USPC ......................................................... 434/169
    See application file for complete search history.

(56) References Cited

U.S. PATENT DOCUMENTS

| | | | |
|---|---|---|---|
| 5,364,272 | A | 11/1994 | Herman et al. |
| 5,823,782 | A | 10/1998 | Marcus et al. |
| 5,991,693 | A | 11/1999 | Zalewski |
| 6,030,225 | A | 2/2000 | Chan |
| 6,676,412 | B1 | 1/2004 | Masterson et al. |
| 6,755,657 | B1 | 6/2004 | Wasowicz |
| 6,884,075 | B1 | 4/2005 | Tropoloc |
| 7,050,754 | B1 * | 5/2006 | Marcus ............... G09B 7/04 434/362 |
| 7,203,455 | B2 | 4/2007 | Ernst et al. |
| 7,357,321 | B2 | 4/2008 | Yoshida et al. |
| 8,057,233 | B2 | 11/2011 | Owen |
| 8,199,117 | B2 | 6/2012 | Izadi et al. |
| 10,607,502 | B2 | 3/2020 | Butler et al. |
| 2002/0090596 | A1 | 7/2002 | Sosoka et al. |
| 2002/0142270 | A1 | 10/2002 | Furry |
| 2002/0160340 | A1 | 10/2002 | Marcus et al. |
| 2003/0017442 | A1 | 1/2003 | Tudor et al. |
| 2004/0056781 | A1 | 3/2004 | Rix et al. |
| 2004/0219495 | A1 | 11/2004 | Marcus et al. |
| 2006/0127871 | A1 | 6/2006 | Grayson |
| 2007/0003912 | A1 | 1/2007 | Freedman |
| 2008/0281851 | A1 | 11/2008 | Izadi et al. |
| 2009/0315258 | A1 | 12/2009 | Odom et al. |
| 2009/0325140 | A1 | 12/2009 | Gray et al. |
| 2010/0273133 | A1 | 10/2010 | Lehmann |
| 2010/0279265 | A1 | 11/2010 | Heffernan |
| 2011/0195389 | A1 | 8/2011 | Deyoung et al. |
| 2012/0009557 | A1 | 1/2012 | Marcus et al. |
| 2012/0015341 | A1 | 1/2012 | Self et al. |
| 2012/0086877 | A1 | 4/2012 | Kaoh |
| 2012/0031561 | A1 | 12/2012 | Listim |
| 2013/0069908 | A1 | 3/2013 | Sung |
| 2013/0130212 | A1 | 5/2013 | Dohring et al. |
| 2013/0203022 | A1 | 8/2013 | Al-qudsi |
| 2013/0295535 | A1 | 11/2013 | Levy et al. |
| 2013/0302763 | A1 | 11/2013 | Edwards et al. |
| 2013/0302776 | A1 | 11/2013 | King et al. |
| 2013/0335109 | A1 | 12/2013 | Chen et al. |
| 2014/0134590 | A1 | 5/2014 | Hiscock, Jr. |
| 2014/0220540 | A1 | 8/2014 | Burgin et al. |
| 2014/0234809 | A1 | 8/2014 | Colvard |
| 2014/0322685 | A1 | 10/2014 | Kennerly et al. |
| 2015/0125835 | A1 | 5/2015 | Wittich et al. |
| 2015/0287339 | A1 | 10/2015 | Deshmukh et al. |
| 2015/0356881 | A1 | 12/2015 | Butler et al. |
| 2016/0035241 | A1 | 2/2016 | Butler et al. |
| 2016/0180734 | A1 * | 6/2016 | Shi .................... A63F 13/77 434/169 |
| 2016/0210484 | A1 | 7/2016 | Shi et al. |
| 2016/0325197 | A1 | 11/2016 | Smith |
| 2018/0137781 | A1 | 5/2018 | Tikkun et al. |
| 2020/0027368 | A1 | 1/2020 | Butler et al. |
| 2021/0005100 | A1 | 1/2021 | Butler et al. |

OTHER PUBLICATIONS

"International Application Serial No. PCT/US2019/037861, International Preliminary Report on Patentability dated Jan. 7, 2021", 11 pgs.

U.S. Appl. No. 14/730,232, filed Jun. 3, 2015, Phonics Exploration Toy.

U.S. Appl. No. 14/816,536, filed Aug. 3, 2015, Letter Manipulative Identification Board.

U.S. Appl. No. 16/016,585, filed Jun. 23, 2018, Symbol Manipulation Educational System and Method.

"U.S. Appl. No. 14/816,536, Response filed Apr. 7, 2020 to Final Office Action dated Jan. 10, 2020", 7 pgs.

"U.S. Appl. No. 16/016,585, Non Final Office Action dated Jun. 12, 2020", 28 pgs.

"U.S. Appl. No. 14/816,536, Notice of Allowance dated Jul. 2, 2020", 8 pgs.

"U.S. Appl. No. 14/816,536, Corrected Notice of Allowability dated Sep. 3, 2020", 2 pgs.

"U.S. Appl. No. 16/016,585, Response filed Sep. 22, 2020 to Non Final Office Action dated Jun. 12, 2020", 17 pgs.

"U.S. Appl. No. 14/816,536, 312 Amendment filed Sep. 23, 2020", 5 pgs.

"U.S. Appl. No. 14/816,536, PTO Response to Rule 312 Communication dated Oct. 7, 2020", 2 pgs.

"U.S. Appl. No. 14/730,232, Examiner Interview Summary dated Apr. 9, 2019", 2 pgs.

"U.S. Appl. No. 14/730,232, Examiner Interview Summary dated Sep. 27, 2019", 3 pgs.

"U.S. Appl. No. 14/730,232, Final Office Action dated Feb. 26, 2019", 16 pgs.

"U.S. Appl. No. 14/730,232, Non Final Office Action dated Apr. 19, 2018", 16 pgs.

"U.S. Appl. No. 14/730,232, Non Final Office Action dated Jul. 15, 2019", 17 pgs.

"U.S. Appl. No. 14/730,232, Notice of Allowance dated Nov. 20, 2019", 17 pgs.

"U.S. Appl. No. 14/730,232, Response filed Feb. 19, 2018 to Restriction Requirement dated Sep. 19, 2017", 14 pgs.

"U.S. Appl. No. 14/730,232, Response filed Oct. 15, 2019 to Non-Final Office Action dated Jul. 15, 2019", 15 pgs.

"U.S. Appl. No. 14/730,232, Response filed Oct. 19, 2018 to Non Final Office Action dated Apr. 19, 2018", 19 pgs.

"U.S. Appl. No. 14/730,232, Response filed Jun. 7, 2019 to Final Office Action dated Feb. 26, 2019", 16 pgs.

"U.S. Appl. No. 14/730,232, Restriction Requirement dated Sep. 19, 2017", 6 pgs.

"U.S. Appl. No. 14/816,536, Final Office Action dated Jan. 10, 2020", 16 pgs.

"U.S. Appl. No. 14/816,536, Non Final Office Action dated Sep. 20, 2017", 13 pgs.

"U.S. Appl. No. 14/816,536, Response filed Feb. 18, 2018 to Non Final Office Action dated Sep. 20, 2017", 14 pgs.

"International Application Serial No. PCT/US2019/037861, International Search Report dated Oct. 4, 2019", 5 pgs.

"International Application Serial No. PCT/US2019/037861, Written Opinion dated Oct. 4, 2019", 9 pgs.

"U.S. Appl. No. 16/016,585, Non Final Office Action dated Jun. 10, 2021", 28 pgs.

"U.S. Appl. No. 16/016,585, Response filed May 24, 2021 to Final Office Action dated Dec. 24, 2020", 15 pgs.

"European Application Serial No. 19823611.9, Extended European Search Report dated Jul. 13, 2021", 7 pgs.

"Indian Application Serial No. 202117000616, First Examination Report dated Aug. 13, 2021", 6 pgs.

\* cited by examiner

| CHILD ACTION | LETTERS ON PAD | APP OUTPUT | NOTE |
|---|---|---|---|
| PLACES "C" | C | "C" : "K-" | |
| PLACES "G" | C G | "C,G" : "KG" | PRONOUNCES INCOMPLETE WORDS ACCORDING TO PHONETIC RULES (EVEN WITHOUT VOWELS) |
| REMOVES "G" | C | "C" : "K-" | |
| PLACES "A" | C A | "C, A" : "KA-" | PRONOUNCES INCOMPLETE WORDS ACCORDING TO PHONETIC RULES |
| PLACES "T" | C A T | "C, A, T" : "CAT!" (PLAYS CAT ANIMATION) | PRONOUNCES KNOWN WORD AND PLAYS ANIMATION IF IT EXISTS |
| PLACES "S" | C A T S | "C, A, T, S" : "CATS!" (PLAYS CAT ANIMATION TWICE) | PLURAL AWARENESS |
| REMOVES "T S" PLACES "B" | C A B | "C, A, B" : "CAB" (DISPLAYS WORD RECOGNITION) | RECOGNIZES "CAB" IS A WORD, EVEN THOUGH THERE IS NO ANIMATION FOR IT |
| | | | |
| | K A T | "K, A, T" : "KAT" (ON SCREEN "CAT" IS DISPLAYED FOR THE PROPER SPELLING) | SPELLING SUGGESTIONS FOR HOMOPHONES/ COMMON MISSPELLINGS |

FIG. 8

PHONICS EXPLORATION TOY

CROSS-REFERENCE TO RELATED APPLICATIONS

The present application is a continuation of U.S. Applications. Ser. No. 14/730,232 filed Jun. 3, 2015, which claims the benefit of priority of U.S. Provisional App. No. 62/007,413, filed Jun. 4, 2014, which are herein incorporated by reference in their entireties.

BACKGROUND

Field of the Invention

The present invention is generally in the area of educational toys for children, and specifically relates to a system and method of teaching phonics involving physical manipulatives as well as software.

Description of Related Art

Children learning to read are often encouraged to use phonics to "sound out" letters in a word. This helps the child understand the sounds made by different letters and thus assimilate the rules of English spelling and pronunciation. Since children are physical learners and respond well to tactile stimulation, many manipulatives exist for the purpose of teaching reading—alphabet blocks, letter-shaped magnets, and other similar things. A child using such toys can learn the shape of the letters by touch as well as by sight and thus learn them better.

English not entirely a phonetic language, and thus many complex rules exist for the pronunciation of different letter combinations. For example, the "ough" in "cough" is not pronounced the same way as the "ough" in "through", and the "c" in "cat" is not pronounced the same way as the "c" in "cot". A child learning how to read in English is therefore at a disadvantage compared to a child learning to read Russian or Hebrew or any other language with phonetic spelling.

Since most adults know the rules of pronunciation implicitly rather than explicitly, a child's parent would be able to sound out a random combination of letters put together by the child—for example, "CAG"—without necessarily knowing why the combination is pronounced that way. Repeated over time and many different letter combinations, this game of "pronounce a random combination of letters" will eventually result in the child learning the rules of English spelling and pronunciation implicitly and becoming a very confident and solid reader.

While this game is very useful, it is also highly time-consuming for the adult participants. Most adults do not have the time or the interest to spend hours pronouncing random nonsense.

Several educational toys exist on the market for teaching proper spelling. Such toys typically provide alphabet blocks or letter-shaped manipulatives that a child can arrange on a board; a computer is connected to a sensor network and picks up the location of the letters. The computer is then able to display the letters on the screen and to determine whether or not the child spelled a word correctly. However, such toys typically do not have an exploratory component—i.e. they do not encourage the child to just throw random combination of letters together and find out what they sound like; typically, they merely tell the child whether his/her spelling is "right" or "wrong". At best, such toys pronounce individual letters and the sounds made by individual letters; however, this is not very useful to a child who wants to know what THUSCHIEKO (or some similar random combination of letters that contains phonemes made up of several letters) will sound like.

A need therefore exists for a toy that encourages the learning of phonics by determining the pronunciation of random combinations of letters made by the child.

SUMMARY OF THE INVENTION

An object of the present invention is to provide an educational toy that enables the exploration of phonetic pronunciation.

Another object of the present invention is to provide an educational toy that combines physical manipulatives with a software game.

Another object of the present invention is to provide an educational toy that generates pronunciations automatically when given a combination of letters.

The method of the present invention in its preferred embodiment comprises placing at least two letter manipulatives on a letter identification board to form a combination of letters, using the letter identification board to identify the combination of letters, generating a proper pronunciation for the combination of letters, and using a speaker to pronounce the pronunciation.

The step of generating a proper pronunciation is preferably looking up the combination of letters in a database that comprises combinations of letters and pronunciations for those combinations of letters, and determining the proper pronunciation associated with the combination of letters. In an alternate embodiment, a phonetic algorithm may be used to analyze the combination of letters and to generate a pronunciation.

In an embodiment, the method also comprises determining whether the combination of letters is a word, and if it is, showing a short animation or providing a sound effect. In another embodiment, the method also comprises determining whether the combination of letters is a common misspelling of a word, and displaying a correct spelling for the word and/or providing a sound effect.

In an embodiment, the letter identification board can be used to identify the combination of letters by using a camera to get an image of the letter identification board with the letters on it, transmitting the image to a computing device, and using OCR software to identify the letters.

In another embodiment, the letter identification board can be used to identify the combination of letters by having each letter be a different color, and illuminating each letter with red light, green light, and then blue light, to evaluate its RGB value and thus to identify the letter.

In another embodiment, each letter comprises a RFID tag and the letter identification board comprises a RFID reader, and the RFID tags are used to identify the letters.

In another embodiment, each letter comprises a resistor of a unique value for each letter and the letter identification board is conductive; the total resistance value for the letter identification board with the combination of letters on it is then used to identify the combination of letters.

In another embodiment, each letter comprises an array of spaces, each space having either a conductive plate or no conductive plate, the pattern being unique to each letter. The letter identification board comprises an array of spaces, each space being occupied by two conductive plates. When a letter is placed on the letter identification board, the change of capacitance of each space is evaluated; the unique pattern of change in capacitance is used to identify each letter.

The user can access personalized resources by logging into an account. In an embodiment, the step of logging in is spelling out the user's name on the letter identification board. The personalized resources can be short animations or sound effects.

In an embodiment, the method may also comprise recording a user saying a word, analyzing the recording to determine what word was said, and requesting the user to spell out the word with letter manipulatives. The system then provides feedback to the user.

The system of the present invention preferably comprises a plurality of letter manipulatives, a letter identification board on which a combination of letter manipulatives may be placed, and a computing device connected to the letter identification board, comprising a display, a speaker, and a processor and memory, where the processor is configured to identify the letter manipulatives placed on the letter identification board and to generate a proper pronunciation for the combination of letter manipulatives.

The computing device is preferably a tablet, and e preferred embodiment, the letter identification board comprises a holder for the tablet.

In an embodiment, the letter identification board is at least partially transparent, and a camera is placed underneath the letter identification board. The image taken by the camera is then used to identify the letter manipulatives placed on the letter identification board.

In an embodiment, each letter is a different color, and the letter identification board comprises a red LED, a green LED, and a blue LED, and a photo diode for determining how much light is reflected off a letter manipulative. The amounts of reflected light of each color are then used to identify the RGB value of the color of the letter manipulative, and thus the letter.

In an embodiment, each letter comprises a resistor, wherein the value of the resistor is unique for each letter. The letter identification board is conductive and able to connect to each resistor; the value of the resistance is then used to identify each letter.

In an embodiment, each letter comprises at least one conductive plate, located in such a way that it does not touch the surface of the letter identification board. The letter identification board comprises at least one conductive plate as well, in such a way that the conductive plates form at least one capacitor when the letter is placed on the letter identification board. The value of the capacitor or capacitors is unique for each letter, and is then used to identify each letter.

In another embodiment, the letter identification board comprises a plurality of letter spaces, with each letter space comprising a rectangular array of capacitor areas, each capacitor area comprising a ground plate and a signal plate. Each letter manipulative has a unique pattern of conductive pads located in such a way that each conductive pad lines up with a capacitor area and forms two capacitors in series when the letter manipulative is placed in a letter space. The capacitance of each capacitor area is then measured and the pattern of capacitances is used to identify each letter.

In an embodiment, the system can identify when a letter manipulative is placed on a letter space by tracking the change in capacitance.

The system may also comprise at least one indicator light located on the letter identification board. In an embodiment, each letter space can comprise an indicator light. In an embodiment, the letter manipulatives are at least partially transparent so they can be backlit by the indicator lights.

The letter manipulatives are preferably shaped in such a way that they can only fit on the letter identification board when they're right side up or upside down. In the preferred embodiment, the letter manipulatives are shaped like the letters they represent (rather than like rectangular blocks, for example).

LIST OF FIGURES

FIG. 8 shows a sample play pattern for the app.

DETAILED DESCRIPTION

Figure 1:
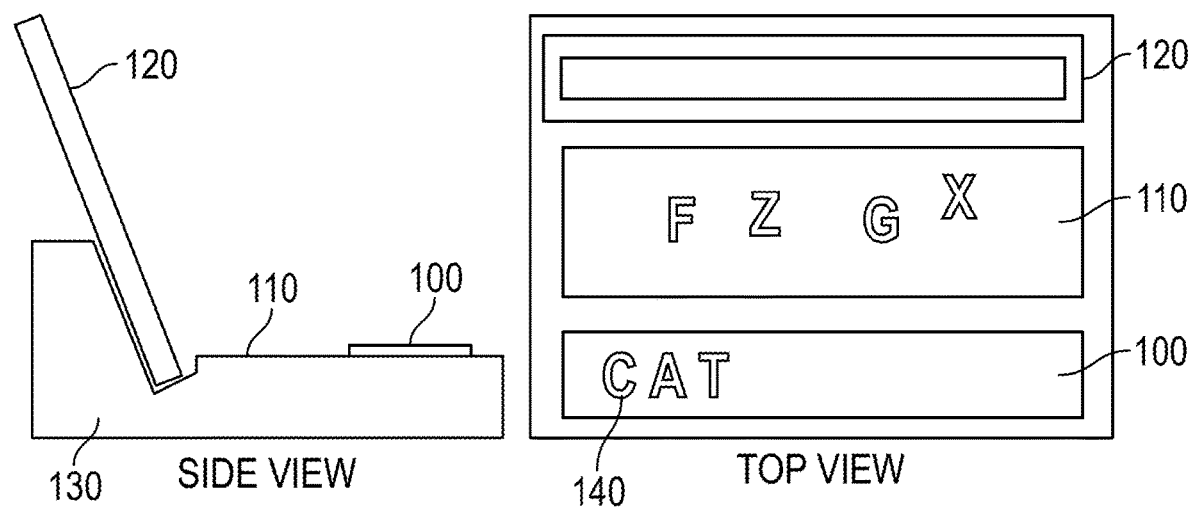
FIG. 1 shows a diagram of the preferred embodiment of the system of the present invention.

In its preferred embodiment, as shown in FIG. 1, the system of the present invention comprises a set of letter manipulatives 140, a letter identification board 100 for the placement of the letter manipulatives thereon, and a computing device 120 connected to the letter identification board that can interpret the information generated by the letter identification board, determine the location and identity of the letter manipulatives placed on it, apply the rules of phonetic pronunciation to generate a pronunciation for the set of letter manipulatives on the letter identification board, and use a speaker connected to the computing device to pronounce the pronunciation. In the preferred embodiment, the computing device 120 is a tablet. In the preferred embodiment, the letter identification board also comprises a storage area 110 for unused letters, and a tablet support 130. However, it will be understood that both of those elements are optional.

The letter manipulatives 140 are preferably shaped like actual letters to make the learning experience tactile as well as visual, and are preferably approximately 1.25"-1.5" in size. The letter manipulatives may also be shaped like rectangular tiles with three-dimensional letter protrusions on them, as alphabet blocks with letters on the faces, or in any other way that they can be perceived by a child. In an embodiment, the letter manipulatives may also be colored different colors, and/or may have different textures to make the learning experience even more sensory. For example, vowels may be colored differently from consonants. In another embodiment, the letter manipulatives may also comprise Braille patterns for the letter in question. The letter manipulatives are preferably made of a nontoxic and durable material that is safe for young children to use.

The letter identification board 100 is preferably a board that can easily accommodate a group of several letters and that can sense which letters are placed on the board and the relative position of the letters to each other. This sensing can be accomplished by several different methods. In the preferred embodiment, capacitance is used to determine which letters are located on the board, as described below.

In an embodiment, the letter identification board 100 has a backlit surface that illuminates each letter space so that a child knows where to place the letter. This can be an underline, a dot, the entire perimeter of the space, or the entire space. The letter manipulative may also be translucent or partially translucent so that they can glow when selected. The backlighting may also be used to illuminate particular letters; for example, letters that comprise compound consonants such as TH may be backlit, or silent letters may be backlit, depending on the needs of the user.

Figure 2:
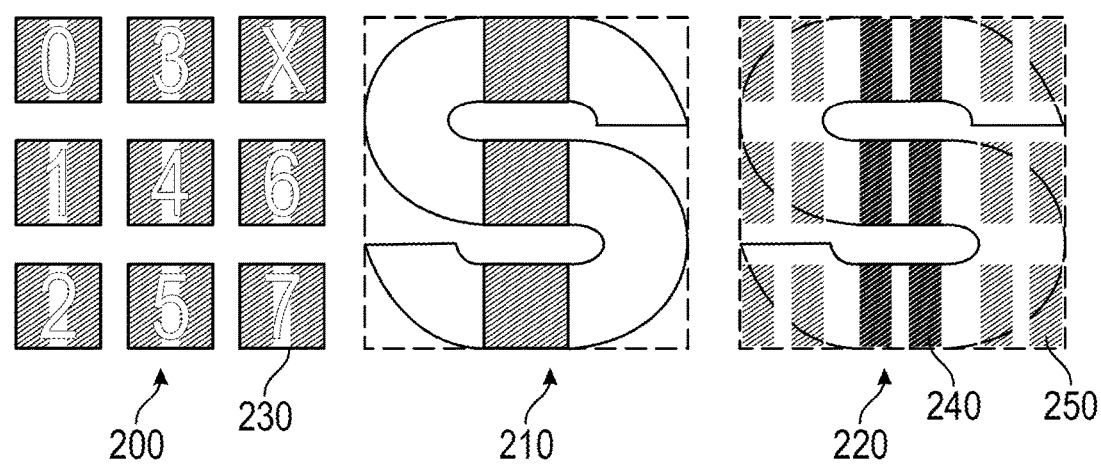
FIG. 2 shows the capacitive sensor system used in the preferred embodiment of the system of the present invention.

FIG. 2 shows the capacitive sensor system used in the preferred embodiment of the present invention. The letter identification board comprises eight letter readers arranged in a row. Each letter reader 200 has eight active and one inactive sensor bits arranged in a 3×3 grid, as shown; the inactive sensor bit is the upper right bit X. Each sensor bit comprises two adjacent copper pads 230 embedded to a certain depth into the surface of the sensor board. One of the copper pads is grounded and the other is connected to the sensor circuit. Each letter has a unique pattern of copper pads that is embedded into its bottom surface. One such letter 210 is shown in the Figure. When a letter is placed on the letter reader 220, each copper pad on the bottom of the letter creates two series-connected parallel plate capacitors (shown as 240), and the locations where there is no copper pad do not create any capacitors (shown as 250). The capacitive sensor system can then measure the capacitance at each of the eight sensor bits. Each sensor bit where a letter pad is present (indicated by a high capacitance reading) is assigned a "mark" and each sensor bit where a letter pad is not present (indicated by a low capacitance reading) is assigned an "unmark". The unique pattern of marks and unmarks generates an 8-bit number that can then be decoded by the computing device to determine which letter is present, as well as its orientation.

The sensing pads on the letter identification board are preferably covered by a very thin layer of high-dielectric material that helps protect the pads and helps form the capacitors. This can be done by either placing a thin plastic sheet across all the pads, or by a full plane silkscreen over the entire area of the pads. The second is preferable, since it is cheaper and adds no new process to the PCB manufacturing process.

Figure 2A:
FIG. 2A shows a sample set of letter manipulatives used in the preferred embodiment of the system of the present invention.

FIG. 2A shows the preferred embodiment of the pad patterns on the letters. In the preferred embodiment, fewer pads are used for vowels and frequently-used letters (for example, E uses only one pad). The font shape is chosen so that a unique pad pattern can be used for each letter. The pads on the letters may be created by an adhesive label with conductive ink that is adhered to the back of the letter, conductive paint painted onto the back of the letters, conductive ink printed onto the hack of the letters, or any other method. In the preferred embodiment, the font shapes used in the app are the same as the font shape of the letter manipulatives, to minimize confusion. Also, as shown in FIG. 2A, the letter manipulatives are preferably shaped like the letters they represent, to maximize tactile learning for the child. The shape of the letters is preferably such as to accommodate the conductive pads.

Figure 3:
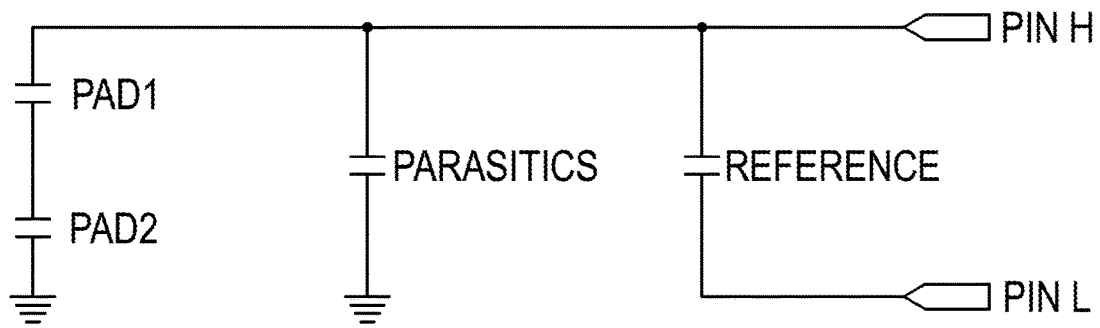
FIG. 3 shows a simplified schematic of the sensor circuit used in the capacitive sensor system.

The capacitive sensing system uses the charge transfer method of capacitance measurement. To do that, one repeatedly charges an unknown capacitance and then transfer the charge to a reference capacitor of known value. The number of charge transfer cycles required to raise the reference capacitor's voltage to a given value is related to the unknown capacitance. FIG. 3 shows a simplified schematic of the sensor circuit used to measure a single sensor bit. PAD1 and PAD2 are the two series connected parallel plate capacitors created by a letter pad present over the sensor bit. The equation for the capacitance of a parallel plate capacitor is given by $$C = \varepsilon_r \varepsilon_0 \frac{A}{d},$$

where A is the area of the sensor bit pad, d is the approximate separation of the plates, and $\varepsilon_r$ is the relative permittivity of plastic. In the preferred embodiment, $\varepsilon_r=3$, A is 33.31 mm$^2$, and d=0.051 mm. Thus, the approximate capacitance of each one of the PAD1 and PAD2 capacitors will be 17.3 pF, and their combined capacitance in series will be 8.65 pF. When there is no letter pad present over the sensor hit, the capacitance is negligible. The parasitic capacitance is due to layout geometry and ICs in the signal path, and can vary from sensor bit to sensor bit; experimentally, the parasitic capacitance was found to be around 100-200 pF. The reference capacitor is a ceramic capacitor with a capacitance much greater than the unknown plus the parasitic capacitance. A larger reference capacitor will provide a higher resolution, but require a longer time to perform the measurement. Experimentally, a value of 22 nF was found to be a good compromise between speed and resolution.

Figure 4:
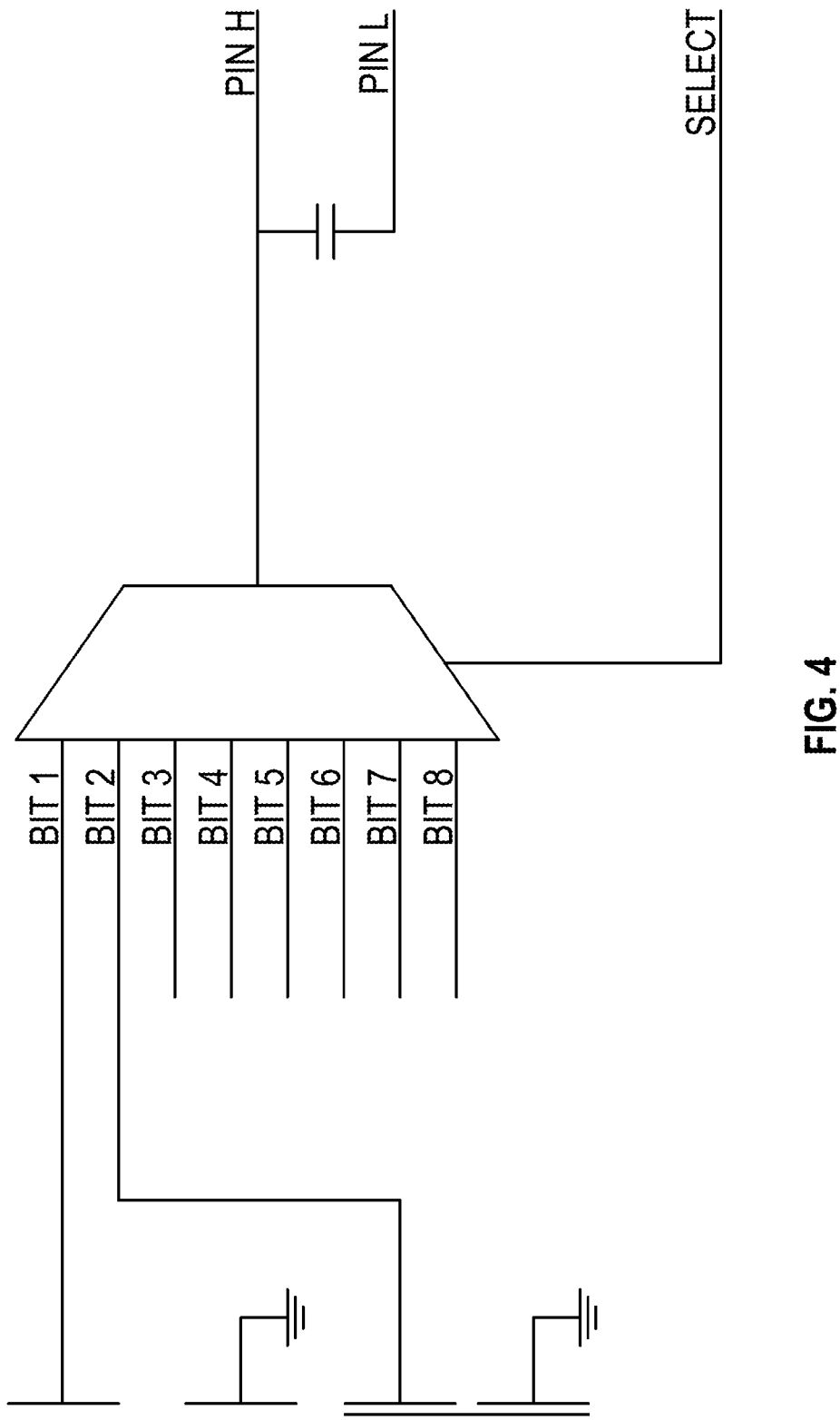
FIG. 4 shows a circuit diagram of the preferred embodiment of the capacitive sensor.

FIG. 4 shows a circuit diagram for the preferred embodiment of the capacitive sensor. Pin H and pin L are made to output a low (0V) voltage. To measure the capacitance, first the counter is set to 0. The unknown capacitance is charged, and then the reference capacitor is disconnected from the circuit by making pin L high impedance (making it an input). Pin H is made to output a high (UV) voltage. The charge is transferred to the reference capacitor, and pin H is made high impedance. The reference capacitor is reconnected to the circuit by making pin L output a low voltage. The counter is incremented by 1. If the voltage on pin H is greater than $V_{IH}$, the value of counts representing the capacitance is recorded; if not, the charge and transfer process is repeated. The number of counts is then used to indicate the capacitance of the unknown capacitor, and therefore, whether there is a "mark" or an "unmark".

It will be understood that while the preferred embodiment uses copper pads to accomplish its purpose, any other conductive material is also usable for this purpose, as long as the pads made with the conductive material can form a capacitor.

Figure 5:
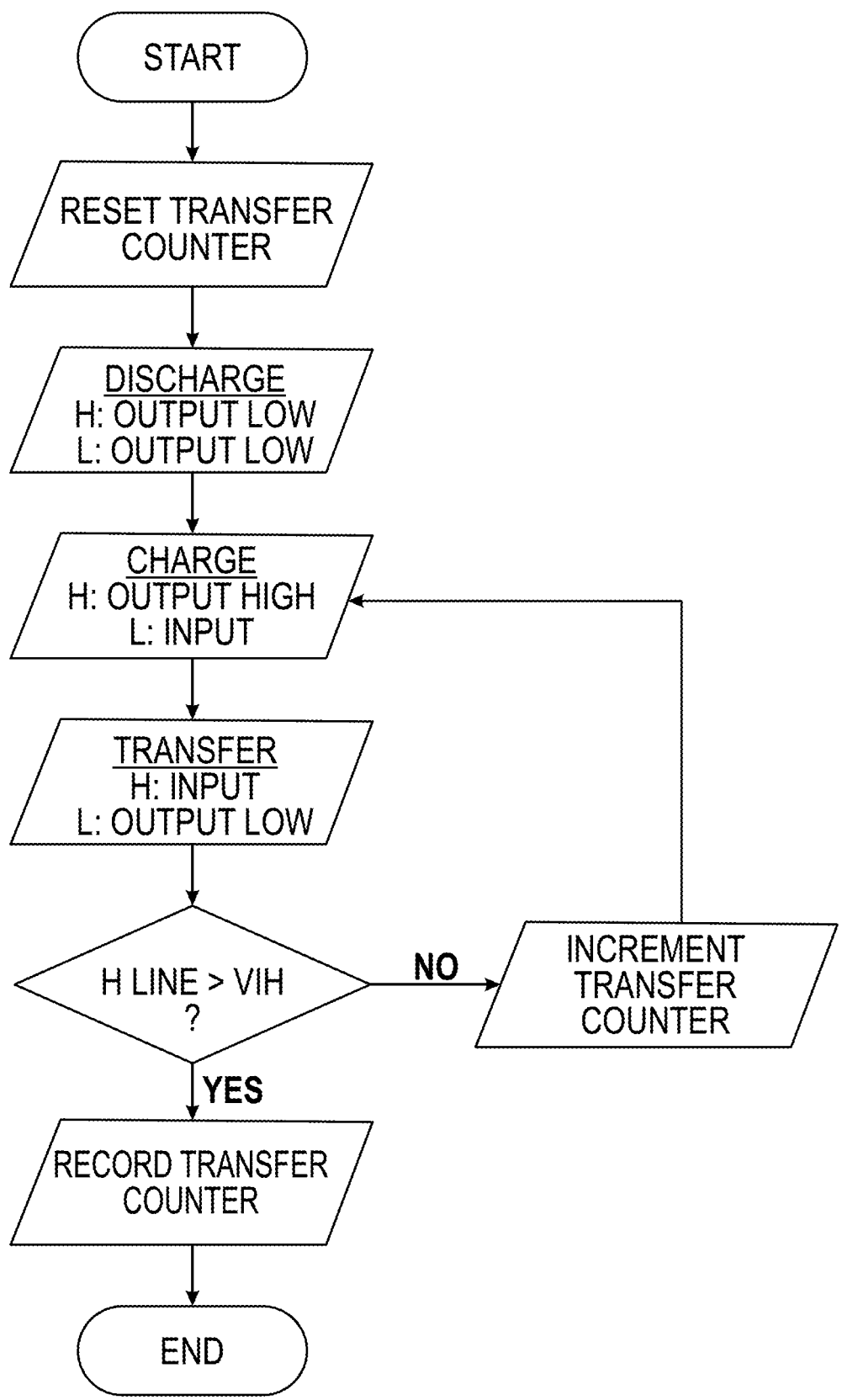
FIG. 5 shows a flowchart of the process of evaluating the capacitance of each of the eight sensor bits.

FIG. 5 shows a flowchart of the process of evaluating the capacitance of each of the eight sensor bits. As shown, the transfer counter is reset, then the capacitors are discharged by setting the H and L outputs low. Then, the unknown capacitor is charged; the charge is transferred to the reference capacitor; and the output of the H line is compared to $V_{IH}$. If it is not greater than $V_{IH}$, the counter is incremented by 1 and these steps are repeated. If it is greater than $V_{IH}$, the value of the counter is recorded.

The sensor module needs to also be able to determine when a letter is placed on the board or removed. If the value of the capacitance changes by a significant amount, the system concludes that a letter was placed or removed and goes through the reading process. If the capacitance changes by less than the threshold, the system ignores it—a finger touch can register a capacitance, but it will be less than the conductive pad. Furthermore, if a letter is placed on the board upside-down, the material of the letter manipulative itself (plastic or wood) will cause the sensor area to register a change in capacitance, but it will still be smaller than the change caused by having a conductive pad placed on the board. The change in capacitance is continuously evaluated and the accumulated delta is tracked.

Figure 6:
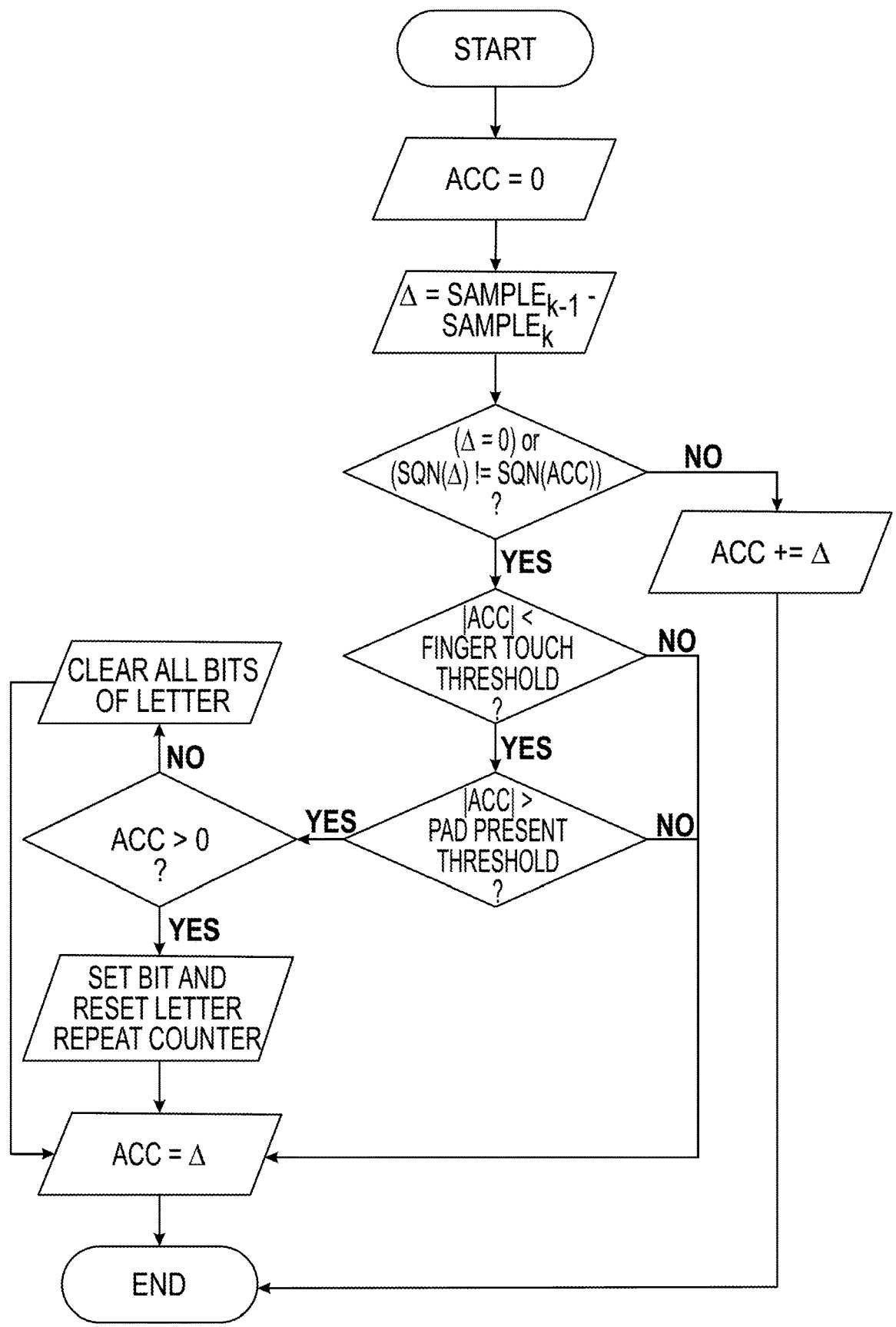
FIG. 6 shows a flowchart for determining when a letter was placed or removed on the board.

FIG. 6 shows a flowchart for determining when a letter was placed or removed on the letter identification board. Acc is the accumulated deltas of the capacitance.

The above is the preferred embodiment for evaluating what letters were placed on the letter identification board. However, other embodiments are also possible, as described below. Furthermore, embodiments that are not described, but are apparent to one of reasonable skill in the art, are also encompassed by the present invention.

In an alternate embodiment, the letter identification board comprises a transparent or semi-transparent board on which letters may be placed, and at least one camera placed underneath the board (i.e. on the opposite side from the side on which the letters are placed) in a position that would enable the camera to get an image of the underside of the board and any letters placed on it. The image is then transmitted to the computing device by means of a cable or wirelessly (preferably by Bluetooth), and an OCR program on the computing device determines which letters have been placed on the board and what their relative position is with respect to each other.

In another embodiment, the letter identification board uses color to identify what letters are placed on the board. In that embodiment, each letter is assigned a unique color. When the child places the letters on the board, each letter is briefly illuminated with three different colors (RGB) and a photo diode determines how much light is reflected in each color. The unique RGB combination is then used to identify e letter. The illumination and analysis is preferably provided by LED's and a photo diode located on the top or sides of the board.

Other embodiments may use other ways of identifying the letters. For example, each letter may have an embedded RFID tag that is then read by a reader located within the letter identification board. In another embodiment, each letter may have a built-in resistor and the board may be conductive; the total resistance of all the letters may then be used to deduce which letters are on the board.

The letter identification board may also provide for an attachment mechanism that allows the letters to be securely attached to the board—for example, Velcro or magnets.

Once the letters are placed on the letter identification board and sensed, the sensor information is sent to the computing device. The computing device is preferably a tablet such as an iPad or an iPad Mini, but may also be any other tablet, smartphone, or computer, as long as it comprises at least a display and a speaker. The computing device preferably connects to the sensor board by Bluetooth.

In the preferred embodiment, the computing device comprises an app that is suitable for use by pre-literate children. As such, the primary interaction methods are preferably auditory and iconographic rather than textual, and the user interface is preferably fairly minimal and open-ended.

In the preferred embodiment, one of the functions of the app is to interpret the data from the sensors and to determine which letters are placed on the letter identification board and in what relative position with respect to each other. Preferably, the app is also able to detect when a letter has been placed upside-down or sideways.

In the preferred embodiment, the app comprises a phonics engine that pronounces the letter combination on the board. The phonics engine may use any commonly used phonetic interpretation algorithms to correctly pronounce the letter combination.

In the preferred embodiment, the phonics engine comprises a simple database comprising various letter combinations and their pronunciations. The database is preferably located in the app itself or in the cloud. Whenever new letters are placed on the board, the new combination of letters is reported to the app and looked up in the database; the pronunciation for that combination of letters is then retrieved and pronounced through the speaker of the computing device. In an embodiment, a user may customize the app to include letter combinations such as a child's name (which may not be phonetically pronounced) or other combinations that may have atypical pronunciations.

The phonics engine may also comprise various phonetic algorithms to analyze each letter combination and determine a correct pronunciation for it. Many such phonetic algorithms are known to those skilled in the art of linguistics. After the phonics engine generates a pronunciation for the given letter combination, it sends the pronunciation to the speaker of the computing device.

The app may also be able to recognize empty spots as spaces. This may be used to teach beginning sentence structure.

In the preferred embodiment, the app also comprises a word recognition engine that recognizes any words on the letter identification board. For example, the word recognition engine may comprise a list of common words, and each letter combination may be checked against that list. The child is then rewarded with a short animation or a sound effect when the letter combination on the sensor board is an actual word. Successfully spelling certain preset words ("cat", "elephant", "firetruck", etc.) may also trigger a short animation of the object and a sound effect.

In the preferred embodiment, the app may also recognize when the letter combination on the board is a commonly misspelled variation of an existing word. For example, the word recognition engine may comprise a list of commonly misspelled variations, linked to the correct spelling of a word. The app may then suggest correct spellings on-screen if the child is misspelling a word. Sample dialogue could be "You spelled 'k-a-t', cat is spelled 'c-a-t.'".

The app is preferably rating a child's performance according to a hierarchy. Choosing the correct letter is the first step in the hierarchy; if the correct letter is chosen, the app will then check to see if it is oriented correctly; and if it is oriented correctly, the app will then check to see if it is in the correct spot. However, other hierarchies and other orders are also possible depending on user needs.

The app may be personalized to a particular child. For example, the app may use pictures or names of the child's parents, siblings, or pets. This helps the child connect with the device and find it more relevant.

Figure 7:
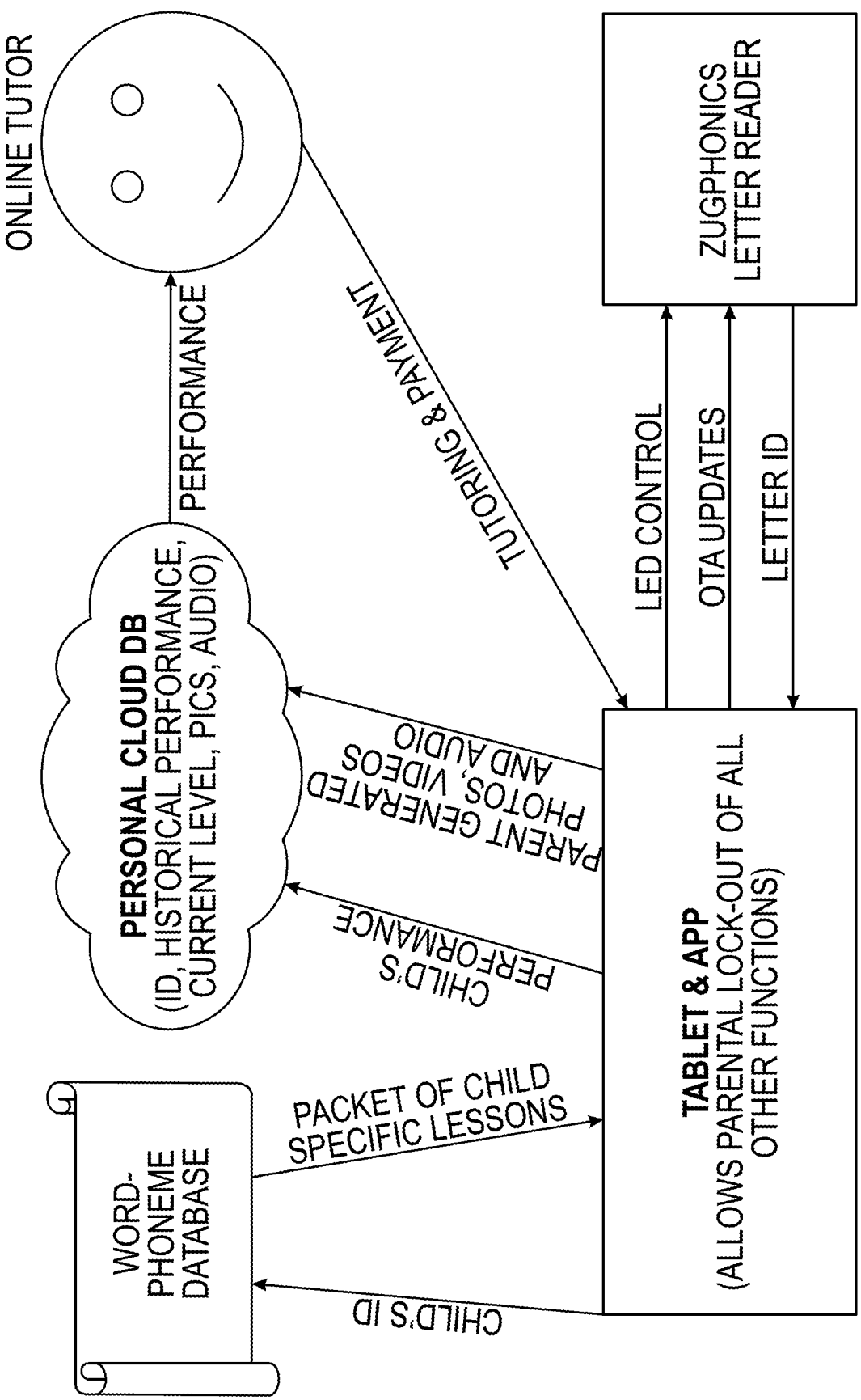
FIG. 7 shows a high-level block diagram of the system of the present invention.

FIG. 7 shows a high-level block diagram of the system of the present invention. As shown, the tablet and app can be used for open-ended explorations, or for specific lessons tailored to an individual child. A child can access their individual lessons and any personalized information by logging in to their account (preferably done by spelling out the child's name on the board). The child can then access their personal cloud database that may comprise their ID, historical performance, current reading level, and any personalized pictures and audio. The child may also access an online tutor that provides personalized tutoring to the child depending on their level and performance.

The app may be used to offer lessons of increased complexity in any way that is appropriate for a child learning to read. In the preferred embodiment, the lessons offered to the child are the following; however, it will be understood that any other sequence of increasing complexity may also be used:
  a. Level 1: basic shape and color recognition; asking the child to pick the right shape or the right color, and to correctly match the shape or color on the screen with the shape or color in the manipulative.
  b. Level 2: letter recognition; asking the child to find a given letter, asking the child to put the letter right-side-up or upside-down, asking the child to find letters that are the same right-side-up or upside-down.
  c. Level 3: letter pattern recognition with CVC word formation. The CVC words are reinforced with visual and audio cues.
  d. Level 4: phonics. The game prompts the child to put any 2 letters down, pronounces the phoneme, then prompts the child to put any 3 letters down, pronounces the phoneme, and so on.
  e. Level 5: sound to letter decoding. The game displays an object and asks the child to find the first letter of the object's name.
  f. Level 6: sound to letter decoding for words without strong visual associations, such as prepositions, verbs, adjectives, and so on. The game gives the child a sound recording and asks the child to fill in a missing word.
  g. Level 7: rhyming. The game presents words and asks the child to pick rhyming words.
  h. Level 8: advanced rhyming. More advanced version of Level 7.
  i. Level 9: last letter manipulation. Child is asked to find words that have the same letters as the given word except for the last letter.
  j. Level 10: CVVC words. Child is asked to recognize and spell words with a double vowel phoneme.
  k. Level 11: CCVC words. Child is asked to recognize and spell words with a double consonant phoneme.
  l. Level 12: syllable construction. Child is asked to recognize syllables in a word.
  m. Level 13: word bank expansion. Child is presented additional words to the "sight words" they had already learned.

The app preferably comprises a diagnostic algorithm that evaluates the child's progress in the lessons offered by the app. If the child does not do well in a particular lesson, it is presented again. If the child does well, the app presents the next lesson in the set.

It is also possible to use the app in exploratory mode without evaluation. FIG. 8 shows a sample play pattern for the app. Note that incomplete words are pronounced even when no vowels are provided.

In an embodiment, the microphone function of the tablet is used to record a child's pronunciation of a word, correct the pronunciation if necessary, and provide feedback. In an embodiment, voice recognition software may be used to identify a word the child says. This feature may be used in a game that assists the child to explore phonics in reverse order, or by sound-letter decoding; for example, if a child says the word "dog", the tablet phonically repeats it d-o-g and then assists the child in spelling it out on the letter identification board.

Exemplary embodiments have been described above. It will, however, be clear to a person of reasonable skill that the invention encompasses other embodiments, which also fall into the scope of the present invention.

What is claimed is:

1. A method comprising:
accessing, by one or more processors, a device that includes a plurality of receptacles, each of the receptacles including an oriented array of device-side capacitor areas, each device-side capacitor area including a first device-side electrode that is grounded, each device-side capacitor area including a second device-side electrode next to the first device-side electrode;
identifying, by the one or more processors, a set of letter manipulatives placed in one or more of the receptacles of the device, each of the letter manipulatives including an oriented array of manipulative-side areas among which are one or more manipulative-side capacitor areas and at least one manipulative-side non-capacitor area, each of the one or more manipulative-side capacitor areas of each letter manipulative including a manipulative-side electrode, the one or more manipulative-side capacitor areas of each letter manipulative and the at least one manipulative-side non-capacitor area of that letter manipulative forming a corresponding pattern for that letter manipulative, the identifying being based on measurements of corresponding capacitances of the device-side capacitor areas while a letter manipulative is in a corresponding receptacle of the device and the oriented array of manipulative-side areas of the letter manipulative is aligned in a common direction with the oriented array of device-side capacitor areas of the corresponding receptacle, the corresponding pattern formed by the one or more manipulative-side capacitor areas and the at least one manipulative-side non-capacitor area of each letter manipulative indicating an orientation of that letter manipulative relative to the device-side capacitor areas of the corresponding receptacle for that letter manipulative, the identified set of letter manipulatives representing a set of letters; and
causing, by the one or more processors, presentation of a pronunciation of the set of letters represented by the identified set of letter manipulatives.

2. The method of claim 1, wherein:
each of the at least one manipulative-side non-capacitor area of each letter manipulative has no manipulative-side electrode; and
the identifying of the set of letter manipulatives is based on the at least one manipulative-side non-capacitor area of the letter manipulative in the corresponding receptacle of the device having no manipulative-side electrode.

3. The method of claim 1, wherein:
the identifying of the set of letter manipulatives is based on a first device-side capacitor area that corresponds to one of the at least one manipulative-side non-capacitor area of a corresponding letter manipulative having smaller capacitance than a second device-side capacitor area that corresponds to one of the one or more manipulative side capacitor areas of the corresponding letter manipulative.

4. The method of claim 1, wherein:
the identifying of the set of letter manipulatives is based on a first device-side capacitor area and a corresponding one of the at least one manipulative-side non-capacitor area of a corresponding letter manipulative forming no series-connected capacitors while a second device-side capacitor area and a corresponding one of the one or more manipulative side capacitor areas of the corresponding letter manipulative form two series-connected capacitors.

5. The method of claim 1, wherein:
the identifying of the set of letter manipulatives is based on a first device-side capacitor area that corresponds to one of the one or more manipulative side capacitor areas of a corresponding letter manipulative having larger capacitance than a second device-side capacitor area that corresponds to one of the at least one manipulative-side non-capacitor area of the corresponding letter manipulative.

6. The method of claim 1, wherein:
the identifying of the set of letter manipulatives is based on a first device-side capacitor area and a corresponding one of the one or more manipulative side capacitor areas of the corresponding letter manipulative forming two series-connected capacitors while a second device-side capacitor area and a corresponding one of the at least one manipulative-side non-capacitor area of a corresponding letter manipulative form no series-connected capacitors.

7. The method of claim 1, wherein:
the one or more manipulative-side capacitor areas of each letter manipulative and the at least one manipulative-side non-capacitor area of that letter manipulative form the corresponding pattern for that letter manipulative.

8. The method of claim 1, wherein:
each second device-side electrode included in each device-side capacitor area of each of the receptacles of the device is communicatively coupled to a sensor circuit of the device; and
the identifying of the set of letter manipulatives includes measuring the corresponding capacitances of the device-side capacitor areas via the sensor circuit of the device.

9. A system comprising:
a device including a plurality of receptacles, each of the receptacles including an oriented array of device-side capacitor areas, each device-side capacitor area including a first device-side electrode that is grounded, each device-side capacitor area including a second device-side electrode next to the first device-side electrode;
one or more processors; and
a memory storing instructions that, when executed by the one or more processors, cause the one or more processors to perform operations comprising:
identifying a set of letter manipulatives placed in one or more of the receptacles of the device, each of the letter manipulatives including an oriented array of manipulative-side areas among which are one or more manipulative-side capacitor areas and at least one manipulative-side non-capacitor area, each of the one or more manipulative-side capacitor areas of each letter manipulative including a manipulative-side electrode, the one or more manipulative-side capacitor areas of each letter manipulative and the at least one manipulative-side non-capacitor area of that letter manipulative forming a corresponding pattern for that letter manipulative, the identifying being based on measurements of corresponding capacitances of the device-side capacitor areas while a letter manipulative is in a corresponding receptacle of the device and the oriented array of manipulative-side areas of the letter manipulative is aligned in a common direction with the oriented array of device-side capacitor areas of the corresponding receptacle, the corresponding pattern formed by the one or more manipulative-side capacitor areas and the at least one manipulative-side non-capacitor area of each letter manipulative indicating an orientation of that letter manipulative relative to the device-side capacitor areas of the corresponding receptacle for that letter manipulative, the identified set of letter manipulatives representing a set of letters; and
causing presentation of a pronunciation of the set of letters represented by the identified set of letter manipulatives.

10. The system of claim 9, wherein:
each of the at least one manipulative-side non-capacitor area of each letter manipulative has no manipulative-side electrode; and
the identifying of the set of letter manipulatives is based on the at least one manipulative-side non-capacitor area of the letter manipulative in the corresponding receptacle of the device having no manipulative-side electrode.

11. The system of claim 9, wherein:
the identifying of the set of letter manipulatives is based on a first device-side capacitor area that corresponds to one of the at least one manipulative-side non-capacitor area of a corresponding letter manipulative having smaller capacitance than a second device-side capacitor area that corresponds to one of the one or more manipulative side capacitor areas of the corresponding letter manipulative.

12. The system of claim 9, wherein:
the identifying of the set of letter manipulatives is based on a first device-side capacitor area and a corresponding one of the at least one manipulative-side non-capacitor area of a corresponding letter manipulative forming no series-connected capacitors while a second device-side capacitor area and a corresponding one of the one or more manipulative side capacitor areas of the corresponding letter manipulative form two series-connected capacitors.

13. The system of claim 9, wherein:
the identifying of the set of letter manipulatives is based on a first device-side capacitor area that corresponds to one of the one or more manipulative side capacitor areas of a corresponding letter manipulative having larger capacitance than a second device-side capacitor area that corresponds to one of the at least one manipulative-side non-capacitor area of the corresponding letter manipulative.

14. The system of claim 9, wherein:
the identifying of the set of letter manipulatives is based on a first device-side capacitor area and a corresponding one of the one or more manipulative side capacitor areas of the corresponding letter manipulative forming two series-connected capacitors while a second device-side capacitor area and a corresponding one of the at least one manipulative-side non-capacitor area of a corresponding letter manipulative form no series-connected capacitors.

15. The system of claim 9, wherein:
the one or more manipulative-side capacitor areas of each letter manipulative and the at least one manipulative-side non-capacitor area of that letter manipulative form the corresponding pattern for that letter manipulative.

16. The system of claim 9, wherein:
- each second device-side electrode included in each device-side capacitor area of each of the receptacles of the device is communicatively coupled to a sensor circuit of the device; and
- the identifying of the set of letter manipulatives includes measuring the corresponding capacitances of the device-side capacitor areas via the sensor circuit of the device.

17. A non-transitory machine-readable storage medium comprising instructions that, when executed by one or more processors of a machine, cause the machine to perform operations comprising:
- accessing a device that includes a plurality of receptacles, each of the receptacles including an oriented array of device-side capacitor areas, each device-side capacitor area including a first device-side electrode that is grounded, each device-side capacitor area including a second device-side electrode next to the first device-side electrode;
- identifying a set of letter manipulatives placed in one or more of the receptacles of the device, each of the letter manipulatives including an oriented array of manipulative-side areas among which are one or more manipulative-side capacitor areas and at least one manipulative-side non-capacitor area, each of the one or more manipulative-side capacitor areas of each letter manipulative including a manipulative-side electrode, the one or more manipulative-side capacitor areas of each letter manipulative and the at least one manipulative-side non-capacitor area of that letter manipulative forming a corresponding pattern for that letter manipulative, the identifying being based on measurements of corresponding capacitances of the device-side capacitor areas while a letter manipulative is in a corresponding receptacle of the device and the oriented array of manipulative-side areas of the letter manipulative is aligned in a common direction with the oriented array of device-side capacitor areas of the corresponding receptacle, the corresponding pattern formed by the one or more manipulative-side capacitor areas and the at least one manipulative-side non-capacitor area of each letter manipulative indicating an orientation of that letter manipulative relative to the device-side capacitor areas of the corresponding receptacle for that letter manipulative, the identified set of letter manipulatives representing a set of letters; and
- causing presentation of a pronunciation of the set of letters represented by the identified set of letter manipulatives.

18. The non-transitory machine-readable storage medium of claim 17, wherein:
- each of the at least one manipulative-side non-capacitor area of each letter manipulative has no manipulative-side electrode; and
- the identifying of the set of letter manipulatives is based on the at least one manipulative-side non-capacitor area of the letter manipulative in the corresponding receptacle of the device having no manipulative-side electrode.

19. The non-transitory machine-readable storage medium of claim 17, wherein:
- the identifying of the set of letter manipulatives is based on a first device-side capacitor area that corresponds to one of the at least one manipulative-side non-capacitor area of a corresponding letter manipulative having smaller capacitance than a second device-side capacitor area that corresponds to one of the one or more manipulative side capacitor areas of the corresponding letter manipulative.

20. The non-transitory machine-readable storage medium of claim 17, wherein:
- the identifying of the set of letter manipulatives is based on a first device-side capacitor area and a corresponding one of the at least one manipulative-side non-capacitor area of a corresponding letter manipulative forming no series-connected capacitors while a second device-side capacitor area and a corresponding one of the one or more manipulative side capacitor areas of the corresponding letter manipulative form two series-connected capacitors.

\* \* \* \* \*

UNITED STATES PATENT AND TRADEMARK OFFICE
CERTIFICATE OF CORRECTION

| | | |
|---|---|---|
| PATENT NO. | : 11,238,752 B2 | Page 1 of 1 |
| APPLICATION NO. | : 16/794570 | |
| DATED | : February 1, 2022 | |
| INVENTOR(S) | : Butler et al. | |

It is certified that error appears in the above-identified patent and that said Letters Patent is hereby corrected as shown below:

On the Title Page

On page 2, in Column 1, item (56) under "U.S. Patent Documents", Line 32, delete "2012/0031561" and insert --2012/0315610-- therefor In the Specification In Column 1, Line 7, delete "14/730,232" and insert --14/730,232,-- therefor In Column 1, Line 33, after "English", insert --is--

In Column 3, Line 22, delete "e" and insert --in the-- therefor

In Column 5, Line 55, delete "hack" and insert --back-- therefor

In Column 6, Line 20, delete "hit," and insert --bit,-- therefor

In Column 6, Line 37, delete "(UV)" and insert --(3.3V)-- therefor

In Column 7, Line 37, delete "e" and insert --the-- therefor

Signed and Sealed this
Twenty-seventh Day of June, 2023

Katherine Kelly Vidal
*Director of the United States Patent and Trademark Office*